UNITED STATES PATENT OFFICE.

GEORGE H. HOOD, OF CHELSEA, MASSACHUSETTS.

IMPROVEMENT IN VULCANIZED-RUBBER ROLLERS FOR CLOTHES-WRINGERS AND OTHER PURPOSES.

Specification forming part of Letters Patent No. 213,110, dated March 11, 1879; application filed February 4, 1879.

*To all whom it may concern:*

Be it known that I, GEORGE H. HOOD, of Chelsea, Massachusetts, have invented an Improvement in Vulcanized-Rubber Rollers for Clothes-Wringers and other Purposes; and that the same is described in the following specification in such full, clear, and exact terms as to enable persons skilled in the art to understand and practice my invention.

The object of my improvement is to secure a tubular elastic wringer-roller upon its shaft so firmly that they shall invariably revolve together.

My invention consists in the process, hereinafter set forth, of preparing the interior of the elastic tube for a permanent union with the shaft, and also in the combination of an elastic tube so prepared with a suitable shaft.

Great difficulty has been experienced in the manufacture and use of clothes-wringers, by reason of the imperfect attachment of the shaft and roller to each other, and numerous plans have been devised to hold the elastic covering upon the rigid shaft. I have discovered, and by my present invention have remedied, the principal cause of this difficulty, as will now be explained.

The most common method of uniting elastic rollers to their cylindrical shafts is to swab out and cement the bore of the tube and expand it over the shaft, previously wound with twine and coated with rubber cement. The constriction of the rubber and the adhesive power of the cement are relied on to resist the strains of use. These elastic tubes are usually made in a mold on an iron rod, which preserves the axial perforation during the process of vulcanization, and is then withdrawn. To facilitate its removal and prevent adhesion of the rubber thereto, this rod is dusted with powdered talc or soap-stone before the raw-rubber compound is applied. The rubber cannot adhere to the rod where this powder is interposed. But there is a disadvantage in this fact. The same property which is thus relied on to prevent adhesion to the rod on which the roller is made subsequently acts to prevent adhesion to the shaft on which it is to be used.

During vulcanization the rubber compound softens and expands by the heat in the inclosing-mold, and is thereby pressed powerfully in every direction, and the inner layer next to the central rod becomes intermingled (more or less) with the talc or soap-stone powder, so that the inner wall is made up of a mixture of this powder with the rubber compound. There is also incorporated with this complex inner film a dark scale, due to chemical action upon the iron rod. So far as these ingredients are present in this part of the tube there can be no permanent union between it and the shaft.

The ordinary swabbing out of the tube merely wipes its inner surface, but does not penetrate the surface nor act beyond it.

My invention therefore consists in removing this inner wall or complex film, so that all the intermixed talc and iron scale may be eliminated, and no obstacle may remain to prevent the intimate union of the shaft and elastic body by means of the rubber cement.

In carrying out my invention I take the vulcanized-rubber tubes as ordinarily constructed, and, by grinding, filing, or other abrading means, I remove the film which constitutes the wall of the bore, and embraces so much of the tube as contains an admixture of the scale, talc, or soap-stone powder, with the rubber compound. I find it most convenient to effect this abrasion by means of a rotary grinder having a diameter somewhat less than that of the original bore of the tube, and working within it. When this step is completed the bore is to be cleared of all the comminuted particles, and one or more coatings of rubber cement applied therein.

The shaft, wound with twine or otherwise, is also to be coated with cement, and forced into the bore of the tube in the usual manner.

There being no longer an element antagonistic to the union of the roller and shaft, they will be permanently joined at every point of their contiguous surfaces, and thus the adhesion is made more complete, and an increase of strength and durability is secured.

I claim as of my invention—

1. The improvement herein described in the art of making wringer-rollers, consisting in removing the interior wall or complex film surrounding the bore of the tube, substantially as and for the purpose set forth.

2. The combination, with a suitably-cemented shaft, of a vulcanized-rubber roller having the inner film surrounding the bore thereof removed by abrasion, whereby the roller is adapted for more permanent attachment to its shaft, substantially as set forth.

GEO. H. HOOD.

Witnesses:
A. H. SPENCER,
O. R. PRESCOTT.